United States Patent
Sun et al.

(10) Patent No.: US 12,497,486 B2
(45) Date of Patent: Dec. 16, 2025

(54) POLYAMIDE 5X FIBER, PREPARATION METHOD THEREOF, AND USE THEREOF

(71) Applicants: CATHAY BIOTECH INC., Shanghai (CN); CIBT AMERICA INC., Newark, DE (US)

(72) Inventors: Chaoxu Sun, Shanghai (CN); Xiucai Liu, Shanghai (CN)

(73) Assignees: CATHAY BIOTECH INC., Shanghai (CN); CIBT AMERICA INC, Newark, DE (US)

( * ) Notice: Subject to any disclaimer, the term of this patent is extended or adjusted under 35 U.S.C. 154(b) by 641 days.

(21) Appl. No.: 17/758,892

(22) PCT Filed: Jan. 15, 2020

(86) PCT No.: PCT/CN2020/072329
§ 371 (c)(1),
(2) Date: Jul. 15, 2022

(87) PCT Pub. No.: WO2021/142677
PCT Pub. Date: Jul. 22, 2021

(65) Prior Publication Data
US 2023/0051716 A1    Feb. 16, 2023

(51) Int. Cl.
| | | |
|---|---|---|
| C08G 69/26 | (2006.01) | |
| D01D 5/088 | (2006.01) | |
| D01D 5/098 | (2006.01) | |
| D01F 6/60 | (2006.01) | |

(52) U.S. Cl.
CPC ............. *C08G 69/26* (2013.01); *D01D 5/088* (2013.01); *D01D 5/098* (2013.01); *D01F 6/60* (2013.01); *D10B 2331/02* (2013.01); *D10B 2401/063* (2013.01); *D10B 2401/14* (2013.01)

(58) Field of Classification Search
CPC ....... D01F 6/60; D10B 2331/02; C08G 69/26; C08L 77/00
See application file for complete search history.

(56) References Cited

FOREIGN PATENT DOCUMENTS

| | | |
|---|---|---|
| CN | 103966681 | 8/2014 |
| CN | 106555249 | 4/2017 |
| CN | 106555250 | 4/2017 |
| CN | 106637471 | 5/2017 |
| CN | 106835329 | 6/2017 |
| CN | 106868623 | 6/2017 |
| CN | 106868624 | 6/2017 |
| CN | 106884215 | 6/2017 |
| CN | 106894106 | 6/2017 |
| CN | 106906533 | 6/2017 |
| CN | 108301062 | 6/2017 |
| CN | 106958046 | 7/2017 |
| CN | 108505135 | 7/2018 |
| CN | 108505133 | 9/2018 |
| CN | 108505134 | 9/2018 |
| CN | 108505136 | 9/2018 |
| CN | 108796653 | 11/2018 |
| CN | 110117831 | 8/2019 |
| CN | 110904524 | 3/2020 |
| EP | 4047113 | 8/2022 |
| JP | 2009084749 | 4/2009 |

*Primary Examiner* — Gregory Listvoyb
(74) *Attorney, Agent, or Firm* — Robin L. Teskin; Baker, Donelson, Bearman, Caldwell & Berkowitz PC

(57) ABSTRACT

The present application discloses a polyamide 5X fiber, wherein raw materials for producing the polyamide 5X fiber comprise at least 1,5-pentane diamine and a long carbon chain diacid; or comprises a polyamide 5X obtained by the polymerization of 1,5-pentane diamine and a long carbon chain diacid as monomers. The 1,5-pentane diamine or the long carbon chain diacid are produced from bio-based raw materials by a fermentation process or an enzymatic conversion process; and the long carbon chain diacid is at least one of C6-20 aliphatic long carbon chain diacids. The long carbon chain diacid is at least one of C6-20 aliphatic long carbon chain diacids. The polyamide 5X fiber includes pre-oriented yarns, drawn textured yarns, fully drawn yarns, staple fibers, industrial yarns, continuous bulked filaments and monofilaments, preferably pre-oriented yarns, drawn textured yarns and/or fully drawn yarns. The raw materials used for producing the polyamide 5X resin are prepared by biological processes, and are green materials. The polyamide 5X fiber has good mechanical properties, dimensional stability, softness, quick-drying performance and dyeing properties.

7 Claims, No Drawings

POLYAMIDE 5X FIBER, PREPARATION METHOD THEREOF, AND USE THEREOF

CROSS-REFERENCE TO RELATED APPLICATIONS

This application is a U.S. National Phase application of Int'l Appl. No. PCT/CN2020/072329, filed Jan. 15, 2020, the complete application of which is incorporated herein by reference in its entirety.

TECHNICAL FIELD

This The present disclosure is in the technical field of polyamide materials, and relates to a polyamide 5X fiber, a preparation method thereof and use thereof.

BACKGROUND ART

Polyamide fiber refers to a type of synthetic fibers in which the main chain of fiber macromolecule is connected via amide bonds. Polyamide fiber is one of the earliest industrially produced synthetic fibers, and plays a critical role in the field of synthetic fibers. There are various types of polyamide fibers. Polyamide 6 and polyamide 66 are the most widely industrially produced and used at present. Polyamide 6 and polyamide 66 (also called Chinlon 6 and Chinlon 66 respectively) are mainly used for spinning synthetic fibers. Civil yarn articles produced from polyamide 6/66 are mainly used in fields such as socks, lace underwear, corsets, sports underwear, wedding dresses, casual jackets, sportswear, all-weather coats, outdoor jackets, quick-drying clothes, cold protective clothing, outdoor tents, sleeping bags, and mountaineering bags. Industrial yarns are widely used in fields such as cords, transmission belts, hoses, ropes, fishing nets, tires, and parachutes.

In addition, existing polyamide products are substantively produced from petroleum derivatives. For example, as raw materials for preparing nylon 6 and nylon 66 which have the largest market share, caprolactam and adipic acid are prepared by a series of reactions such as hydrogenation and oxidation of benzene homologues, and hexane diamine is prepared by firstly synthesizing adiponitrile from butadiene or acrylonitrile and then undergoing catalytic hydrogenation. The whole synthesis process is complex and some contaminants are involved.

It has been expected for a long time to use renewable plant resources as starting materials, which grow by absorbing carbon dioxide from air, to prepare green nylons with comparable performances to the existing types of nylons, and thus address the dependence on non-renewable energy and build a recycling society. Under such a background, polyamides, especially polyamide 5X (PA5X), produced from 1,5-pentane diamine as raw material which is obtained by decarboxylation of lysine, are highly desirable as a plant-derived polymer.

SUMMARY OF THE INVENTION

A first object of the present disclosure is to provide high-strength, low-shrinkage, soft, quick-drying and easy-to-dye polyamide 5X pre-oriented yarns, drawn textured yarns and drawn yarns.

A second object of the present disclosure is to provide a process for preparing the polyamide 5X pre-oriented yarns, drawn textured yarns and drawn yarns.

A third object of the present disclosure is to provide a use of the polyamide 5X fiber.

In order to achieve the above objects, the present invention provides the following solutions:

Polyamide 5X Fiber

A polyamide 5X fiber, wherein raw materials for producing the polyamide 5X fiber comprise at least 1,5-pentane diamine and a long carbon chain diacid; or comprises a polyamide 5X resin obtained by the polymerization of 1,5-pentane diamine and a long carbon chain diacid as monomers.

The 1,5-pentane diamine and/or the long carbon chain diacid are produced from bio-based raw materials by a fermentation process or an enzymatic conversion process; and/or the long carbon chain diacid is at least one of C6-20 aliphatic long carbon chain diacids; preferably, the long carbon chain diacid includes adipic acid, sebacic acid, undecandioic acid, dodecandioic acid, tridecandioic acid, tetradecandioic acid, pentadecandioic acid, hexadecandioic acid, heptadecandioic acid, octadecandioic acid, maleic acid and Δ9-1,18-octadecendioic acid; preferably, the long carbon chain diacid is sebacic acid.

The polyamide 510 resin has a relative viscosity of 2.2-2.8, preferably 2.4-2.7.

The polyamide 510 resin has an oligomer content of 1.0 wt % or less, preferably 0.8 wt % or less.

The polyamide 510 resin has a moisture content of 100-1200 ppm, preferably 300-800 ppm.

The polyamide 510 resin has a number average molecular weight of 20000-45000, preferably 28000-43000.

The polyamide 510 resin has a molecular weight distribution of 1.5-2.2, preferably 1.6-1.8.

The polyamide 5X fiber includes polyamide 510 fiber, polyamide 511 fiber, polyamide 512 fiber, polyamide 513 fiber, polyamide 514 fiber, polyamide 515 fiber, polyamide 516 fiber, polyamide 517 fiber and polyamide 518 fiber, preferably polyamide 510 fiber.

The polyamide 5X fiber includes pre-oriented yarns, drawn textured yarns, fully drawn yarns, staple fibers, industrial yarns, continuous bulked filaments and monofilaments, preferably pre-oriented yarns, drawn textured yarns and/or fully drawn yarns.

The polyamide 510 pre-oriented yarn has a fineness of 10-350 dtex, preferably 20-300 dtex, more preferably 30-200 dtex, and still more preferably 40-100 dtex; and/or the polyamide 510 pre-oriented yarn has a break strength of 3.3-4.2 cN/dtex, preferably 3.4-4.1 cN/dtex, more preferably 3.5-4.0 cN/dtex, and still more preferably 3.6-3.9 cN/dtex; and/or the polyamide 510 pre-oriented yarn has a modulus of 20.0-35.0 cN/dtex, preferably 22.0-33.0 cN/dtex, more preferably 24.0-30.0 cN/dtex, and still more preferably 26.0-28.0 cN/dtex; and/or the polyamide 510 pre-oriented yarn has an elongation at break of 60-90%, preferably 63-86%, more preferably 68-82%, and still more preferably 72-78%; and/or the polyamide 510 pre-oriented yarn has a shrinkage in boiling water of 8% or less, more preferably 7% or less, and still more preferably 6% or less; and/or the polyamide 510 drawn textured yarn has a fineness of 10-200 dtex, preferably 20-100 dtex, more preferably 30-80 dtex, and still more preferably 40-60 dtex; and/or the polyamide 510 drawn textured yarn has a break strength of 3.5-5.3 cN/dtex, preferably 3.8-5.0 cN/dtex, more preferably 4.0-4.8 cN/dtex, and still more preferably 4.3-4.6 cN/dtex; and/or the polyamide 510 drawn textured yarn has a modulus of 22.0-38.0 cN/dtex, preferably 24.0-36.0 cN/dtex, more preferably 26.0-34.0 cN/dtex, and still more preferably 28.0-32.0 cN/dtex; and/or the polyamide 510 drawn textured yarn has an elongation at break of 20-50%, preferably 23-45%, more preferably 28-40%, and still more preferably 32-36%; and/or the polyamide 510 drawn textured yarn has a shrinkage in boiling water of 7% or less, more preferably 6% or less, more preferably 5% or less; and/or the polyamide 510 drawn textured yarn has a moisture regain of 2.2% or less, more preferably 2.0% or less, and still more preferably 1.8% or less; and/or the polyamide 510 drawn textured yarn has a crimp contraction of 35-55%, more preferably 38-52%, and still more preferably 42-48%; and/or the polyamide 510 drawn textured yarn has a crimp stability of 38-58%, more preferably 40-55%, and further preferably 43-50%; and/or the polyamide 510 drawn textured yarn has a dye uptake of 90% or more, preferably 93% or more, more preferably 95% or more, and still more preferably 97% or more; and/or a dyeing temperature for the polyamide 510 drawn textured yarn is 80-115° C., preferably 85-110° C., more preferably 88-105° C., and still more preferably 92-100° C.

The polyamide 510 fully drawn yarn has a fineness of 10-350 dtex, preferably 20-300 dtex, more preferably 30-200 dtex, and still more preferably 40-100 dtex; and/or the polyamide 510 fully drawn yarn has a break strength of 4.0-6.0 cN/dtex, preferably 4.3-5.7 cN/dtex, more preferably 4.5-5.3 cN/dtex, and still more preferably 4.7-5.0 cN/dtex; and/or the polyamide 510 fully drawn yarn has a modulus of 24.0-38.0 cN/dtex, preferably 26.0-36.0 cN/dtex, more preferably 28.0-34.0 cN/dtex, and still more preferably 30.0-32.0 cN/dtex; and/or, the polyamide 510 fully drawn yarn has an elongation at break of 20-60%, preferably 25-55%, more preferably 30-50%, and still more preferably 35-45%; and/or the polyamide 510 fully drawn yarn has a shrinkage in boiling water of 10% or less, more preferably 9% or less, and still more preferably 8% or less; and/or the polyamide 510 fully drawn yarn has a moisture regain of 2.2% or less, more preferably 2.1% or less, and still more preferably 1.9% or less; and/or the polyamide 510 fully drawn yarn has a dye uptake of 90% or more, preferably 92% or more, more preferably 94% or more, and still more preferably 96% or more; and/or a dyeing temperature for the polyamide 510 fully drawn yarn is 80-115° C., preferably 83-110° C., more preferably 86-105° C., and still more preferably 90-100° C.

Process for Preparing the Polyamide 5X Fiber

The process for preparing the polyamide 5X fiber comprises the following steps:
(1) polymerizing 1,5-pentane diamine and sebacic acid to form a polyamide 510 melt; or heating a polyamide 510 resin into a molten state with a screw to form a polyamide 510 melt;
(2) conveying the polyamide 510 melt into a spinning beam through a melt pipeline, precisely metering the melt with a metering pump, and then injecting it into a spin pack, and extruding it through a spinneret orifice; and
(3) cooling, finishing, drawing and winding the extruded as-spun fiber to obtain the polyamide 510 pre-oriented yarn;

in Step (1), the screw is heated with four heating zones, wherein the temperature of the first zone is 180-220° C., preferably 190-210° C.; the temperature of the second zone is 210-240° C., preferably 220-230° C.; the temperature of the third zone is 220-250° C., preferably 230-240° C.; and the temperature of the fourth zone is 240-260° C., preferably 245-255° C.; and/or in Step (2), the temperature of the spinning beam is 245-265° C., preferably 250-260° C.; and the pressure of the pack is 12-20 MPa, preferably 14-18 MPa; and/or in Step (3), the cooling includes cooling with quench air and cross air blow, preferably cooling with cross air blow; and/or an air speed is preferably 0.3-0.6 m/s, and more preferably 0.4-0.5 m/s; and/or an air temperature is 18-24° C., preferably 20-23° C., and more preferably 21-22° C.; and/or the finishing is conducted with an oil nozzle; a finish level is 0.4-0.6 wt %, preferably 0.45-0.55 wt %, and more preferably 0.48-0.52 wt %; and/or a winding speed is 4000-4600 m/min, preferably 4200-4500 m/min, and more preferably 4300-4400 m/min.

The present disclosure further provides a process for preparing the polyamide 510 drawn textured yarn, comprising the following steps:
a) directing a polyamide 510 pre-oriented yarn to a first roller with a guide; and thermally drawing the pre-oriented yarn in a first hot box;
b) cooling and setting the pre-oriented yarn with a cooling plate; conveying it through a false twister, a second roller, a third roller, and an interlacing device; and finishing the pre-oriented yarn; and/or
c) winding the pre-oriented yarn to obtain a polyamide 510 drawn textured yarn.

The thermal drawing ratio is 1.2-1.5, preferably 1.25-1.44, and more preferably 1.3-1.4; and/or a thermal drawing temperature is 150-200° C., preferably 160-190° C., and more preferably 170-180° C.; and/or the finishing is conducted with an oil nozzle; a finish level is 2.4-2.8 wt %, preferably 2.5-2.7 wt %, and more preferably 2.55-2.65 wt %; and/or a speed ratio D/Y of the false twister is 1.3-2.0, preferably 1.4-1.8, and more preferably 1.5-1.6; and/or a pressure of compressed air in the interlacing device is 0.3-1.4 MPa, preferably 0.5-1.1 MPa, and more preferably 0.7-0.9 MPa; and/or a winding speed is 500-800 m/min, preferably 550-700 m/min, and more preferably 600-650 m/min; and/or a winding overfeed is 2-8%, preferably 3-7%, and more preferably 4-6%.

The present disclosure further provides a process for preparing the polyamide 510 fully drawn yarn, differing from the process for preparing the polyamide 510 pre-oriented yarn in comprising the following steps:
a thermal setting process prior to the winding, and a thermal setting temperature is 160-200° C., preferably 170-190° C., and more preferably 180-185° C., and/or the finishing is conducted with an oil nozzle; a finish level is 0.8-1.2 wt %, preferably 0.9-1.1 wt %, and more preferably 0.95-1.05 wt %; and/or a drawing ratio is 1.3-3.5, preferably 1.5-3.0, and more preferably 1.8-2.5; and/or a winding speed is 4200-4800 m/min, preferably 4400-4700 m/min, and more preferably 4500-4600 m/min.

Furthermore, the process for preparing the polyamide 510 fully drawn yarn comprises the following steps:

(1) polymerizing 1,5-pentane diamine and sebacic acid to form a polyamide 510 melt; or heating a polyamide 510 resin into a molten state with a screw to form a polyamide 510 melt;

(2) conveying the polyamide 510 melt into a spinning beam through a melt pipeline, precisely metering the melt with a metering pump, and then injecting it into a spin pack, and extruding it through a spinneret orifice; and (3) cooling, finishing, drawing and winding the extruded as-spun fiber to obtain the polyamide 510 fiber.

The process further comprises a thermal setting process prior to the winding, and a thermal setting temperature is 160-200° C., preferably 170-190° C., and more preferably 180-185° C., and/or the finishing is conducted with an oil nozzle; a finish level is 0.8-1.2 wt %, preferably 0.9-1.1 wt %, and more preferably 0.95-1.05 wt %; and/or a drawing ratio is 1.3-3.5, preferably 1.5-3.0, and more preferably 1.8-2.5; and/or a winding speed is 4200-4800 m/min, preferably 4400-4700 m/min, and more preferably 4500-4600 m/min.

Use of the Polyamide 5X Fiber

The present disclosure provides a use of the polyamide 510 fiber in knitted or woven fabrics.

The present disclosure achieves the following advantageous effects by adopting the above technical solutions:

Firstly, the raw materials used for producing the polyamide 5X resins according the present disclosure are prepared by a biological process, and thus are green materials which neither depend on petroleum resources nor cause serious pollution to the environment. Moreover, carbon dioxide emission can be reduced and thus greenhouse effect can be reduced.

Secondly, the polyamide 5X fiber of the present disclosure has good mechanical properties, dimensional stability, softness, quick-drying and dyeing properties.

Thirdly, the polyamide 5X fiber of the present disclosure can be produced by using conventional spinning equipments for polyamide 6, without modifications to the spinning equipments. Merely by optimizing the quality of polyamide 5X resin and the spinning process, the productivity can be increased, and the production costs can be reduced. This will bring about huge benefits to spinning enterprises.

MODE OF CARRYING OUT THE INVENTION

In order to render the objects, technical solutions and advantages of the present disclosure clearer, the technical solutions of the present disclosure will be clearly and completely described hereinafter with reference to the Examples. Obviously, the Examples described are only part but not all of the Examples of the present disclosure. All other Examples obtained by those of ordinary skill in the art based on the examples in the present disclosure without inventive work shall fall within the protection scope of the present disclosure.

(1) Fineness: measured according to GB/T 14343 [Testing Process for Linear Density of Man-made Filament Yarns].

(2) Break Strength: measured according to GB/T 14344-2008.

(3) Elongation at Break: measured according to GB/T 14344-2008.

(4) Modulus: measured according to GB/T 14344-2008.

(5) Relative Viscosity:

The relative viscosity of polyamide 510 resin is measured by concentrated sulfuric acid method using an Ubbelohde viscometer in the following manner: precisely weighing 0.25±0.0002 g dried polyamide 510 resin sample, adding 50 mL concentrated sulfuric acid (96%) for dissolution. The flow-through time t0 of the concentrated sulfuric acid and the flow-through time t of polyamide 510 chip or its staple fiber solution are measured and recorded in a water bath at a constant temperature of 25° C.

Relative viscosity is calculated according to the following equation:

$$\text{relative viscosity } VN=t/t0;$$

t represents the flow-through time of the solution;

t0 represents the flow-through time of the solvent.

(6) Moisture Content: measured by using a Karl-Fischer moisture titrator.

(7) Oil Content: Soxhlet Extraction Method, GB/T 6504 [Man-made Fiber Test Process for Oil Content].

(8) Shrinkage in Boiling Water: referring to GB/6505-2008 [Testing Process for Thermal Shrinkage of Man-made Filament Yarns]. In particular, a polyamide 5X fiber segment is taken. A pretension force of 0.05±0.005 cN/dtex is applied. In the middle of the fiber, it is marked at two points spaced 50.00 cm apart from each other. The marked fiber is wrapped with gauze and boiled in boiling water for 30 minutes. The sample is then baked to dry, and the difference in its length before and after the boiling is measured.

(9) Dye-uptake: the method for measuring the dye-uptake is as follows: Acid Red is used for dyeing. The pH is adjusted to 4.0-6.0, the temperature of the dyeing tank is 40-95° C., and the difference in the concentration of the dye liquor before and after dyeing is measured by using a spectrophotometer.

$$\text{Dye-uptake } (\%)=(A0-At)/A0\times100\%;$$

wherein A0 represents the absorbance value of the characteristic absorption peak of the dye before treatment, and At represents the absorbance value of the dye at the treatment time t.

(10) Moisture Regain: the method for measuring moisture regain is as follows. A washed polyamide 5X fiber in a loose state is placed into an oven for drying. The dried polyamide 5X fiber sample is placed in the standard atmosphere specified in GB/T6529 for conditioning until equilibrium, and humidified for 2 hours. The sample after washing and humidifying is measured for moisture regain. The method for measuring moisture regain is performed according to GB/T6503, wherein the drying temperature of the oven is 105° C. and the drying time is 1 hour.

(11) Oligomer Content Test: water extraction method (gravimetry): about 8 g polyamide 510 resin that has been dried at 130° C. for 7 hours is precisely weighed, and placed into a 500 mL round bottom flask. 400 g of water is added. After refluxing for 36 hours in a heating mantle, the solution is decanted, and the particles are dried at 130° C. for 7 hours in a weight-constant beaker, and then sealed into an aluminum-plastic bag. Upon cooling and weighing, the weight loss is calculated.

(12) Crimp Contraction and Crimp Stability Test: it is measured according to GB/T 6506 [Synthetic Fibre-test Process for Crimp Contraction Properties of Textured Filament Yarns].

Example 1. Preparation of Polyamide 510 Pre-Oriented Yarn

The polyamide 510 pre-oriented yarn was prepared by a process comprising the following steps:

(1) heating a polyamide 510 resin into a molten state with a screw to form a polyamide 510 melt;

(2) conveying the polyamide 510 melt into a spinning beam through a melt pipeline, precisely metering the melt with a metering pump, and then injecting it into a spin pack, and extruding it through a spinneret orifice; and (3) cooling, finishing, drawing and winding the extruded as-spun fiber to obtain the polyamide 510 pre-oriented yarn.

In Step (1), the polyamide 510 resin had a relative viscosity of 2.5; the polyamide 510 resin had an oligomer content of 0.6 wt %; the polyamide 510 resin had a moisture content of 500 ppm; a number average molecular weight of 35000, and a molecular weight distribution of 1.7.

In Step (1), the screw was heated with four zones, wherein the temperature of the first zone was 220° C.; the temperature of the second zone was 230° C.; the temperature of the third zone was 245° C.; and the temperature of the fourth zone was 250° C.

In Step (2), the temperature of the spinning beam was 253° C.; and the pressure of the pack was 15 MPa.

In Step (3), the cooling was cooling with cross air blow; the air speed was 0.5 m/s; and the air temperature was 20° C.;

the finishing was conducted with an oil nozzle; and the finish level was 0.5 wt %; and the winding speed was 4300 m/min.

Comparative Example 1-1

Comparative Example 1-1 was substantively the same as Example 1, except that the polyamide 510 resin had a relative viscosity of 2.0.

Comparative Example 1-2

Comparative Example 1-2 was substantively the same as Example 1, except that the polyamide 510 resin had a moisture content of 1500 ppm.

Comparative Example 1-3

Comparative Example 1-3 was substantively the same as Example 1, except that the polyamide 510 resin had an oligomer content of 1.5 wt %.

Comparative Example 1-4

Comparative Example 1-4 was substantively the same as Example 1, except that the polyamide 510 resin had a molecular weight distribution of 2.5.

Comparative Example 1-5

Comparative Example 1-5 was substantively the same as Example 1, except that in Step (1), the screw was heated with four zones, wherein the temperature of the first zone was 250° C.; the temperature of the second zone was 260° C.; the temperature of the third zone was 275° C.; and the temperature of the fourth zone was 280° C.;

Comparative Example 1-6

Comparative Example 1-6 was substantively the same as Example 1, except that in Step (3), the air speed was 0.2 m/s.

Comparative Example 1-7

Comparative Example 1-7 was substantively the same as Example 1, except that in Step (3), the air temperature was 30° C.

Comparative Example 1-8

Comparative Example 1-8 was substantively the same as Example 1, except that the winding speed was 3500 m/min.

Comparative Example 1-8

Comparative Example 1-8 was substantively the same as Example 1, except that the finish level of the oil nozzle was 0.3 wt %.

Example 2

The polyamide 510 pre-oriented yarn obtained in Example 1 was prepared into a drawn textured yarn in the following steps: firstly, directing a polyamide 510 pre-oriented yarn to a first roller with a guide, and thermally drawing the pre-oriented yarn in a first hot box; then cooling and setting the pre-oriented yarn with a cooling plate, conveying it through a false twister, a second roller, a third roller, and an interlacing device, and finishing the pre-oriented yarn; and finally winding the pre-oriented yarn to obtain a polyamide 510 drawn textured yarn.

The drawing ratio was 1.3; and the drawing temperature was 180° C.;

the speed ratio D/Y of the false twister was 1.65;

the pressure of the compressed air in the interlacing device was 0.6 MPa; and the winding speed was 650 m/min; and the winding overfeed was 3%.

Comparative Example 2-1

Comparative Example 2-1 was substantively the same as Example 2, except that the drawing ratio was 1.1, and the drawing temperature was 120° C.;

Comparative Example 2-2

Comparative Example 2-2 was substantively the same as Example 2, except that the speed ratio D/Y of the false twister was 1.2.

Comparative Example 2-3

Comparative Example 2-3 was substantively the same as Example 2, except that the winding speed was 900 m/min.

Comparative Examples 2-4

Comparative Example 2-4 was substantively the same as Example 2, except that the overfeed was 0.

Example 3 Polyamide 510 FDY Fiber

Example 3 was substantively the same as Example 1, except that a thermal setting process was comprised prior to the winding, the thermal setting temperature was 180° C., the finishing was conducted with an oil nozzle; the finish level was 1.0 wt %; the drawing ratio was 1.6; and the winding speed was 4600 m/min.

Comparative Example 3-1

Comparative Example 3-1 was substantively the same as Example 3, except that the setting temperature was 135° C.

Comparative Example 3-2

Comparative Example 3-2 was substantively the same as Example 3, except that the winding speed was 4000 m/min.

Example 4: Preparation of Polyamide 512 Pre-Oriented Yarn

The polyamide 512 pre-oriented yarn was prepared by a process comprising the following steps:

(1) heating a polyamide 512 resin into a molten state with a screw to form a polyamide 512 melt;

(2) conveying the polyamide 512 melt into a spinning beam through a melt pipeline, precisely metering the melt with a metering pump, and then injecting it into a spin pack, and extruding it through a spinneret orifice; and (3) cooling, finishing, drawing and winding the extruded as-spun fiber to obtain the polyamide 512 pre-oriented yarn.

In Step (1), the polyamide 512 resin had a relative viscosity of 2.4; the polyamide 512 resin had an oligomer content of 0.6 wt %; the polyamide 512 resin had a moisture content of 500 ppm; a number average molecular weight of 28000, and a molecular weight distribution of 1.8; and the screw was heated with four zones, wherein the temperature of the first zone was 220° C.; the temperature of the second zone was 230° C.; the temperature of the third zone was 245° C.; and the temperature of the fourth zone was 250° C.

In Step (2), the temperature of the spinning beam was 253° C.; and the pressure of the pack was 15 MPa.

In Step (3), the cooling was cooling with cross air blow; the air speed was 0.5 m/s; and the air temperature was 20° C.;

the finishing was conducted with an oil nozzle; and the finish level was 0.5 wt %; and the winding speed was 4300 m/min.

Example 5: Preparation of Polyamide 516 Pre-Oriented Yarn

The polyamide 516 pre-oriented yarn was prepared by a process comprising the following steps:

(1) heating a polyamide 516 resin into a molten state with a screw to form a polyamide 516 melt;

(2) conveying the polyamide 516 melt into a spinning beam through a melt pipeline, precisely metering the melt with a metering pump, and then injecting it into a spin pack, and extruding it through a spinneret orifice; and (3) cooling, finishing, drawing and winding the extruded as-spun fiber to obtain the polyamide 516 pre-oriented yarn.

In Step (1), the polyamide 516 resin had a relative viscosity of 2.4; the polyamide 516 resin had an oligomer content 0.6 wt %; the polyamide 516 resin had a moisture content of 500 ppm; a number average molecular weight of 28000, and a molecular weight distribution of 1.8; and the screw was heated with four zones, wherein the temperature of the first zone was 220° C.; the temperature of the second zone was 230° C.; the temperature of the third zone was 245° C.; and the temperature of the fourth zone was 250° C.

In Step (2), the temperature of the spinning beam was 253° C.; and the pressure of the pack was 15 MPa.

In Step (3), the cooling was cooling with cross air blow; the air speed was 0.5 m/s; and the air temperature was 20° C.;

the finishing was conducted with an oil nozzle; and the finish level was 0.5 wt %; and the winding speed was 4300 m/min.

TABLE 1

Performance Test Results of the Fibers in Each Example and Comparative Example

| No. | Fineness (dtx) | Break Strength (cN/dtex) | Modulus (cN/dtex) | Elongation at Break (%) | Shrinkage in boiling water (%) | Moisture Regain (%) | Crimping Contraction (%) | Crimping Stability (%) | Dye-uptake (%) |
|---|---|---|---|---|---|---|---|---|---|
| Example1 | 95 | 3.6 | 26.8 | 80.5 | 7.0 | 2.1 | / | / | / |
| Comparative Example 1-1 | 95 | 2.7 | 36.4 | 78.6 | 8.8 | 2.3 | / | / | / |
| Comparative Example 1-2 | 95 | 2.8 | 37.0 | 79.0 | 9.0 | 2.4 | / | / | / |
| Comparative Example 1-3 | 95 | 2.7 | 38.2 | 81.2 | 9.5 | 2.5 | / | / | / |
| Comparative Example 1-4 | 95 | 2.8 | 36.8 | 80.2 | 8.9 | 2.4 | / | / | / |
| Comparative Example 1-5 | 95 | 2.7 | 35.9 | 79.4 | 9.2 | 2.4 | / | / | / |
| Comparative Example 1-6 | 95 | 3.0 | 38.0 | 78.5 | 8.7 | 2.5 | / | / | / |
| Comparative Example 1-7 | 95 | 2.9 | 37.4 | 81.4 | 8.8 | 2.3 | / | / | / |
| Comparative Example 1-8 | 95 | 2.6 | 36.5 | 79.4 | 9.0 | 2.5 | / | / | / |
| Example 2 | 77 | 4.2 | 30.5 | 28.2 | 6.0 | 2.1 | 48.5 | 52.3 | 95.6 |

TABLE 1-continued

Performance Test Results of the Fibers in Each Example and Comparative Example

| No. | Fineness (dtx) | Break Strength (cN/dtex) | Modulus (cN/dtex) | Elongation at Break (%) | Shrinkage in boiling water (%) | Moisture Regain (%) | Crimping Contraction (%) | Crimping Stability (%) | Dye-uptake (%) |
|---|---|---|---|---|---|---|---|---|---|
| Comparative Example 2-1 | 77 | 3.3 | 37.8 | 28.5 | 8.0 | 2.3 | 32.2 | 34.4 | 88.4 |
| Comparative Example 2-2 | 77 | 3.2 | 36.5 | 27.9 | 8.2 | 2.4 | 32.5 | 33.3 | 87.2 |
| Comparative Example 2-3 | 77 | 3.4 | 38.2 | 28.4 | 8.5 | 2.5 | 32.8 | 32.9 | 86.5 |
| Comparative Example 2-4 | 77 | 3.3 | 37.5 | 28.7 | 8.3 | 2.3 | 30.5 | 33.0 | 87.6 |
| Example 3 | 77 | 5.3 | 33.5 | 40.5 | 7.8 | 2.1 | / | / | 94.8 |
| Comparative Example 3-1 | 77 | 4.5 | 38.4 | 40.3 | 9.4 | 2.3 | / | / | 88.5 |
| Comparative Example 3-2 | 77 | 4.2 | 37.2 | 40.8 | 9.5 | 2.4 | / | / | 87.2 |
| Example 4 | 77 | 3.5 | 25.4 | 80.3 | 7.2 | 1.8 | / | / | 85.2 |
| Example 5 | 77 | 3.4 | 23.8 | 80.5 | 7.3 | 1.0 | / | / | 78.5 |

What is claimed is:

1. A polyamide 510 fiber, characterized in that raw materials for producing the polyamide 510 fiber comprise at least 1,5-pentane diamine and sebacic acid; or comprises a polyamide 510 resin obtained by the polymerization of 1,5-pentane diamine and sebacic acid as monomers, wherein
   (i) the polyamide 510 resin has a relative viscosity of 2.2-2.8;
   (ii) the polyamide 510 resin has an oligomer content of 1.0 wt % or less;
   (iii) the polyamide 510 resin has a moisture content of 100-1200 ppm;
   (iv) the polyamide 510 resin has a number average molecular weight of 20000-45000; and
   (v) the polyamide 510 resin has a molecular weight distribution of 1.5-2.2.

2. The polyamide 510 fiber according to claim 1, characterized in that the 1,5-pentane diamine and/sebacic acid are produced from bio-based raw materials by a fermentation process or an enzymatic conversion process.

3. The polyamide 5X fiber according to claim 1, characterized in that
   (i) the polyamide 510 resin has a relative viscosity of 2.4-2.7; or
   (ii) the polyamide 510 resin has an oligomer content of 0.8 wt % or less; or
   (iii) the polyamide 510 resin has a moisture content of 300-800 ppm; or
   (iv) the polyamide 510 resin has a number average molecular weight of 28000-43000; or
   (v) the polyamide 510 resin has a molecular weight distribution of 1.6-1.8.

4. The polyamide 510 fiber according to claim 1, characterized in that the polyamide 510 fiber includes pre-oriented yarns, drawn textured yarns, fully drawn yarns, staple fibers, industrial yarns, continuous bulked filaments and monofilaments.

5. The polyamide 510 fiber according to claim 1, characterized in that
the polyamide 510 fiber is polyamide 510 pre-oriented yarn, and the polyamide 510 pre-oriented yarn has a fineness of 10-350 dtex; or
   the polyamide 510 pre-oriented yarn has a break strength of 3.0-4.2 cN/dtex; or
   the polyamide 510 pre-oriented yarn has a modulus of 20.0-35.0 cN/dtex; or
   the polyamide 510 pre-oriented yarn has an elongation at break of 60-90%; or
   the polyamide 510 pre-oriented yarn has a shrinkage in boiling water of 8% or less.

6. The polyamide 510 fiber according to claim 1, characterized in that
   the polyamide 5X fiber is polyamide 510 drawn textured yarn, and the polyamide 510 drawn textured yarn has a fineness of 10-200 dtex; or
   the polyamide 510 drawn textured yarn has a break strength of 3.5-5.3 cN/dtex; or
   the polyamide 510 drawn textured yarn has a modulus of 22.0-38.0 cN/dtex; or
   the polyamide 510 drawn textured yarn has an elongation at break of 20-50%; or
   the polyamide 510 drawn textured yarn has a shrinkage in boiling water of 7% or less; or
   the polyamide 510 drawn textured yarn has a moisture regain of 2.2% or less; or
   the polyamide 510 drawn textured yarn has a crimp contraction of 35-55%; or
   the polyamide 510 drawn textured yarn has a crimp stability of 38-58%; or
   the polyamide 510 drawn textured yarn has a dye uptake of 90% or more; or
   a dyeing temperature for the polyamide 510 drawn textured yarn is 80-115° C.

7. The polyamide 510 fiber according to claim 1, characterized in that
   the polyamide 510 fiber is polyamide 510 fully drawn yarn, and the polyamide 510 fully drawn yarn has a fineness of 10-350; or
   the polyamide 510 fully drawn yarn has a break strength of 4.0-6.0 cN/dtex; or
   the polyamide 510 fully drawn yarn has a modulus of 24.0-38.0 cN/dtex; or,
   the polyamide 510 fully drawn yarn has an elongation at break of 20-60; or
   the polyamide 510 fully drawn yarn has a shrinkage in boiling water of 10% or less; or
   the polyamide 510 fully drawn yarn has a moisture regain of 2.2% or less; or
   the polyamide 510 fully drawn yarn has a dye uptake of 90% or more; or a dyeing temperature for the polyamide 510 fully drawn yarn is 80-115° C.

* * * * *